June 15, 1954
W. PETERSEN
2,680,943
BANDAGE FORMING AND WRAPPING MACHINE
Filed Dec. 31, 1948
3 Sheets-Sheet 3
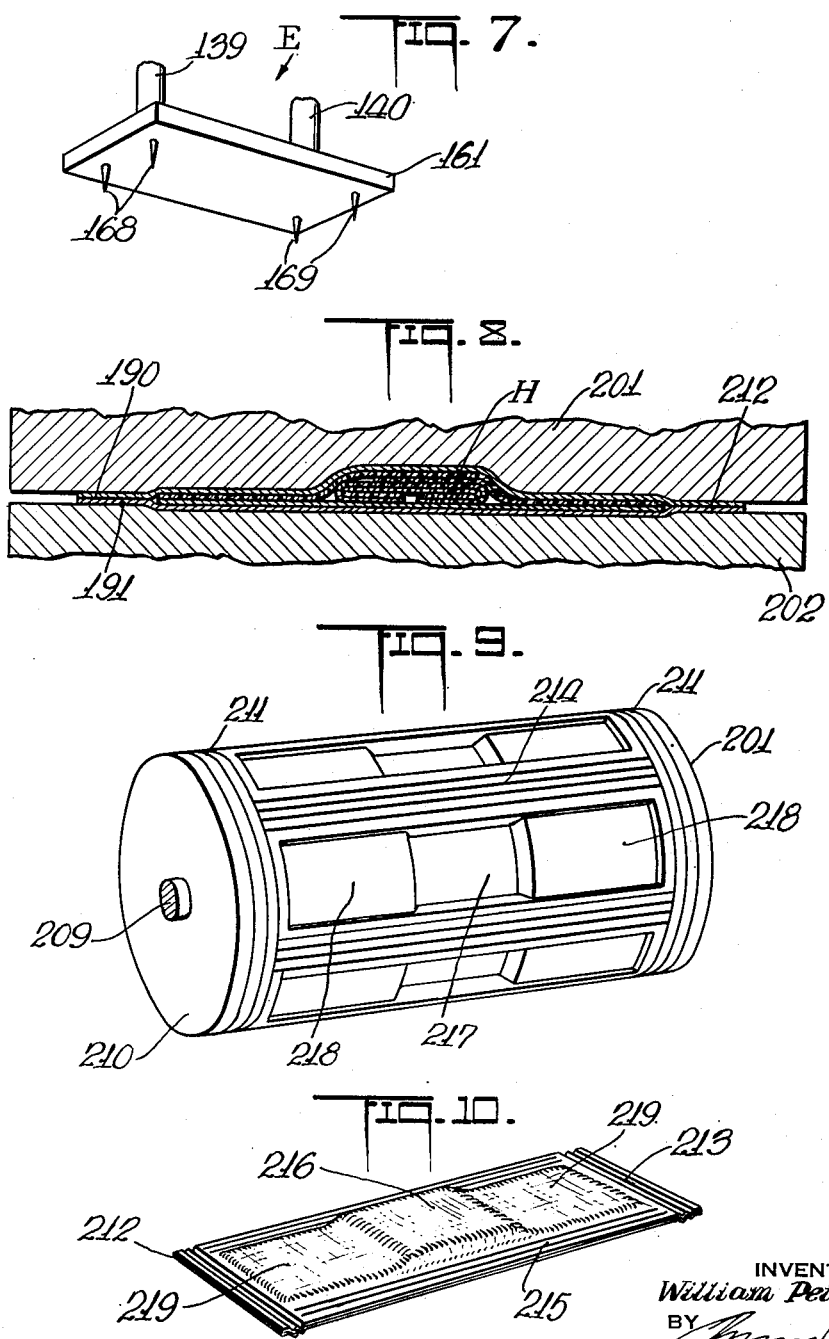
INVENTOR
William Petersen
BY
ATTORNEY Patented June 15, 1954

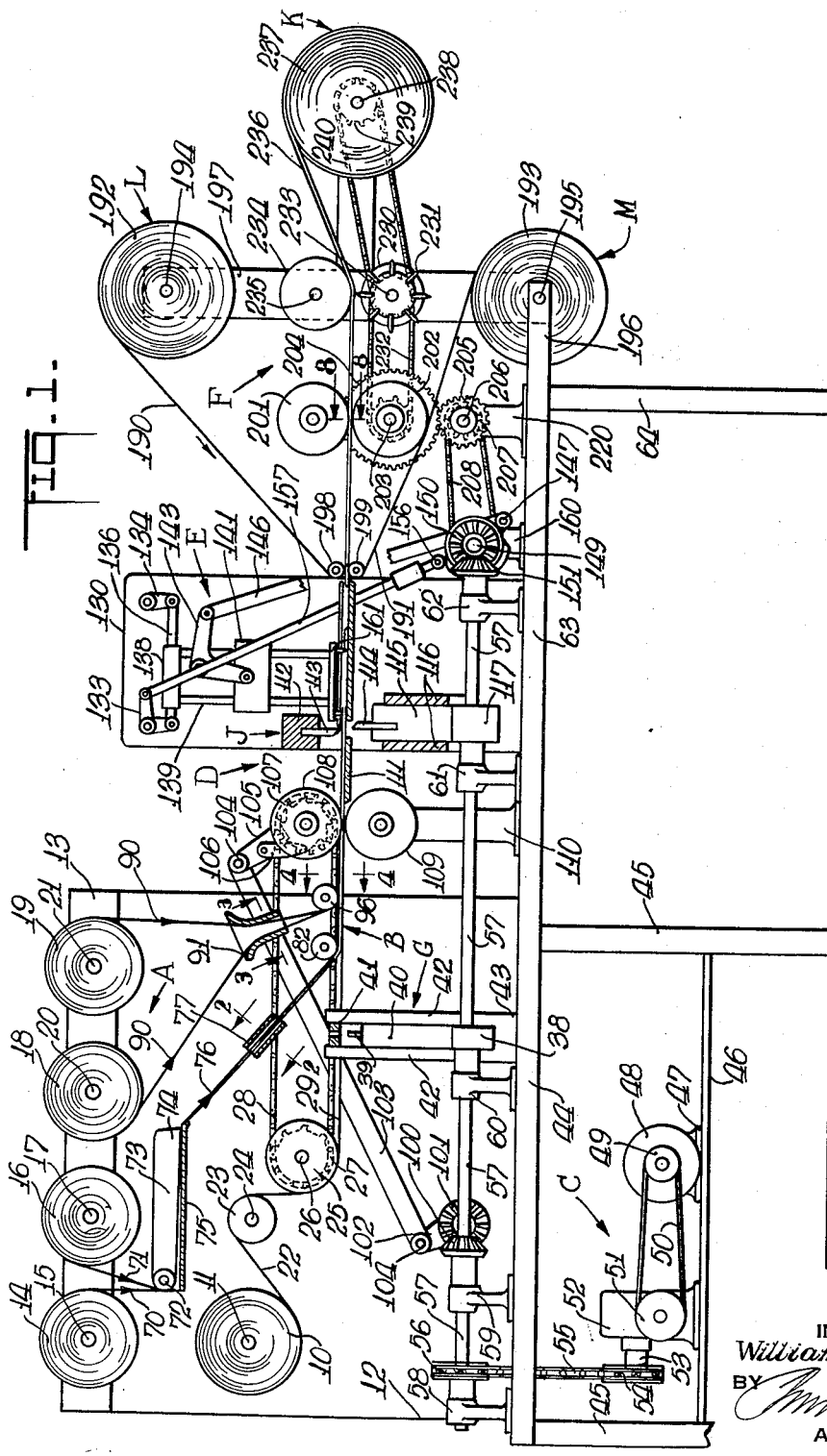

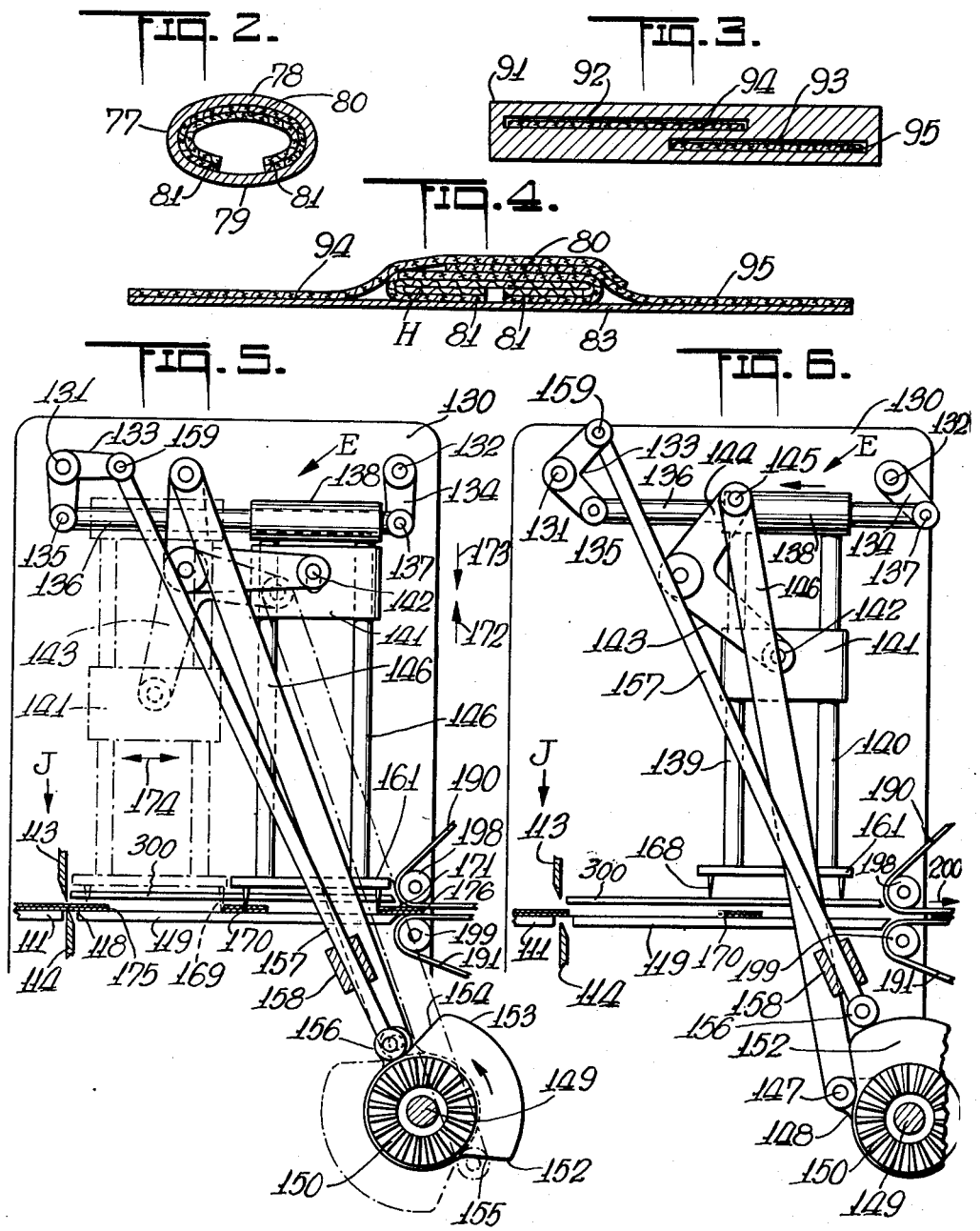

2,680,943

UNITED STATES PATENT OFFICE 2,680,943

BANDAGE FORMING AND WRAPPING MACHINE

William Petersen, New Rochelle, N. Y., assignor to The American White Cross Laboratories, Inc., New Rochelle, N. Y., a corporation of New York Application December 31, 1948, Serial No. 68,714

14 Claims. (Cl. 53—56)

The present invention relates to a prepared bandage forming and wrapping machine and it particularly relates to a method and apparatus for forming prepared bandages.

It is among the objects of the present invention to provide a novel, automatic bandage wrapping machine which will form prepared bandages at a high rate of speed from continuous strips of adhesive tape, gauze and wrapping material and which will wrap said bandages, giving a completely packaged article ready for sale and further bulk packaging.

Another object is to provide a novel bandage forming machine involving automatic standard machinery with a minimum of manual effort and which will produce prepared bandages at a high rate of speed in a large quantity with a minimum of manual labor and with substantially no stoppages for repair and replacement and with little damaged items.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects it has been found most satisfactory, in accordance with one embodiment of the present invention, to provide series of rolls of adhesive tape, gauze and wrapping material. The width of these materials is the same as the length of them in the finished bandage.

These materials then will be feed through guides which will suitably fold the soft gauze to make a pad and then assemble the adhesive tape, folded soft gauze and protective stiff gauze together.

Then a suitable cutting and feeding machine is provided to cut sections of the assembled materials, following which the materials are wrapped, sealed and cut into separate wrapped, prepared packages all without manual intervention.

Desirably, the bandages, after cutting and before wrapping, are fed forwardly by a reciprocatory pin feeding device which forms a distinctive feature of the present invention. Then the cut bandages are passed between two sheets of the wrapping material, which may be paper or foil. The paper or foil is preferably provided with a heat adhesive facing to cause the strips to seal together.

With the foregoing and other objects in view, the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

Fig. 1 is a side elevational diagrammatic view showing the feed assembly, cutting and wrapping stages.

Fig. 2 is a transverse oblique fragmentary detail sectional view upon the line 2—2 of Fig. 1 upon an enlarged scale as compared to Fig. 2, showing the manner of folding the soft gauze to form the pad.

Fig. 3 is an oblique fragmentary detail sectional view upon the line 3—3 of Fig. 1 upon an enlarged scale as compared to Fig. 2, showing the method of offsetting the stiff gauze strips for protecting the adhesive tape.

Fig. 4 is a vertical transverse fragmentary detail sectional vertical view upon the line 4—4 of Fig. 1 upon an enlarged scale as compared to Fig. 1, showing the assembly of the adhesive tape, folded soft gauze forming the pad, and overlapping stiff gauze for protecting the adhesive, before the cutting operation.

Fig. 5 is a diagrammatic side elevational view upon an enlarged scale as compared to Fig. 1, showing the cutting and feeding mechanism for the cut bandages before wrapping, the apparatus being shown in the position when the cut bandages have been moved to their extreme right position.

Fig. 6 is a diagrammatic side elevational view upon an enlarged scale as compared to Fig. 1 and similar to Fig. 5, indicating the subsequent operation when the feeding and advancing mechanism has been elevated and is returned to the left to engage and feed additional, cut bandages to the wrapping mechanism to the right.

Fig. 7 is a fragmentary bottom perspective view of the pin feeding mechanism.

Fig. 8 is a fragmentary transverse vertical sectional view upon an enlarged scale as compared to Fig. 1, upon the line 8—8 of Fig. 1, showing the wrapping material being assembled with the cut bandages.

Fig. 9 is a side perspective view of the heat sealing roller for sealing together the edges of the wrapping material around the cut bandages.

Fig. 10 is a top perspective view showing the completed wrapped and sealed cut bandages, upon an enlarged scale as compared to Fig. 9, and about on the same scale as Figs. 4 and 8.

The mechanism shown in Fig. 1 above essentially consists of the supply arrangement A, the punching mechanism G, the assembly arrangement B, the driving arrangement C, the cutting arrangement D, including the cutting blades J, the feeding arrangement E, the wrapping arrangement F, the wrapper supply L and M, and take-up arrangement K.

Referring to Fig. 1, there is shown the feed roller 10 for carrying the adhesive tape, having a width equal to the bandage length carried on the shaft 11. The shaft 11 is carried on a side frame indicated diagrammatically at 12.

The top of the frame 13 carries a roll 14 for the soft gauze. The roll 14 is carried on the shaft 15, an additional roll 16 for the soft gauze for the pad portion of the bandage is carried on the shaft 17.

The rolls 18 and 19 on the shafts 20 and 21 carry the stiff gauze for protecting the adhesive on the tape.

The adhesive tape passes from roll 10 as indicated by the arrow 22, onto the idler roller 23 having the shaft 24 and then over the feed roller 25 having the shaft 26.

The feed roller 25 is driven by the chain 28 which engages the sprocket wheel 27, turning with the roller 25. The adhesive then passes, as indicated at 29, to the punching machine G.

The punching mechanism G has the reciprocating punch head 40 which acts against a die 41 having openings to receive the punch elements 39 on the head 40 and forming suitable openings in the adhesive tape.

The punch head 40 has the side guide frame members 42 and it is actuated from the eccentric 38. The side frames 42 have a base 43 which rests upon the table 44. The table 44 has the legs 45 with a lower shelf 46.

Upon the shelf 46 is mounted the base 47 of the drive motor 48. The pulley 49 drives the belt 50 which in turn drives the pulley 51 on the gear reduction unit 52.

The outlet drive unit from 53, the gear reduction unit 52, drives the chain 55 through the sprocket 54. The chain 55 drives the sprocket 56 on the shaft 57. The shaft 57 has bearing mounts 58, 59, 60, 61 and 62 on the table 44. The table 45 has an extension 63, which has a separate leg 64.

The soft gauze from the rolls 14 and 16 passes, as indicated at 70 and 71, under the idler roller 72 through the aligning guide 73 having the side walls 74 and the bottom walls 75.

The double layer of soft gauze for the pad then passes, as indicated at 76, to the folder 77 (see also Fig. 2).

In the folder 77, the gauze is folded by the top 78 and the bottom 79 into a double-ply face section 80 as well as the inturned, inside double-ply back edge sections 81 to form a four-ply bandage, best indicated at H in Fig. 4.

From the folder 77, the four-ply folded soft gauze H then passes under the idler roller 82 (see Fig. 1) to the assembly arrangement B, where it is assembled, as indicated in Fig. 4, with the adhesive tape 83 and the stiff gauze 94 and 95.

From the rolls 18 and 19 the stiff protective gauze passes, as indicated at 90, into the guide 91 (see Fig. 3). The guide 91 has offset slots 92 and 93 for guiding the strips of soft 94 and 95 into offset, overlapping relationship, as indicated in Fig. 4. The offset stiff gauze 94 and 95 will pass from the guide 91 under the idler roller 96.

The roller 108 of the assembly arrangement B is driven from the bevel gear 100 on the shaft 57. The bevel gear 100 meshes with the bevel gear 101. The gear 101 drives an arm 102, driving the arm 103 from the pivotal connection 104.

The upper end of the link 103 has a pivotal connection 104 to the arm 105 which carries the pawl 106 on the ratchet 107. The ratchet 107 drives the knurled rolls 108 and 109. The rolls 108 and 109 are pivotally mounted on the standard 110 supported on the table 44.

From the rollers 108 and 109 the assembled material is fed to the platform 111 and to the cutter J. The cutter J consists of an upper carrier 112 with a blade 113 and a lower reciprocating blade 114 on the carrier 115 (see Figs. 1, 5 and 6).

The carrier 115 reciprocates in the guides 116 and is driven by the cam 117 on the shaft 57.

The knife 114 will reciprocate in the space 118 between the guide plates 111 and 119 (see particularly Figs. 5 and 6). When the assembled bandage is cut by the cutting arrangement J, it will consist of adhesive tape 83, on the bottom, the four-ply, folded, soft pad gauze H in the middle, and the overlapping protective stiff gauze 94 and 95 on the top, as shown in Fig. 4.

In the intermittent feed arrangement E, shown in small scale in Fig. 1 and in large scale in Figs. 5 and 6, there is a main backing or support plate 130 having the pivotal connections 131 and 132 for the bell crank lever 133 and the short lever 134. The bell crank lever at its lower end has a pivotal connection 135 to the rod 136. The rod 136 is pivotally connected at 137 to the lower end of the short lever 134.

On the rod 136 is a sliding sleeve 138 which carries the vertical guide members 139 and 140.

On the vertical guide members is provided the oscillatory member 141 which is pivotally connected at 142 to the bell crank lever 143. The bell crank lever 143 is pivotally connected at one end 144 by the pivot 145 to the actuating rod 146.

The actuating rod 146 extends downwardly to the pivotal connection 147 to the lug 148 (see Fig. 6). The lug 148 is rotated by the shaft 149 from the bevel gear 150. The gear 150 is driven by the bevel gear 151 on the end of the shaft 57 (see particularly Fig. 1). The shaft 149 also drives the cam 152 having the lobe 153, the follower roller 156 elevated by the rise 154 and lowered by the drop 155.

The cam follower or roller 156 is carried on the lower end of the actuating rod 157. The actuating rod 157 has a bearing at 158 and at its upper end it has a pivotal connection at 159 to the bell crank lever 133.

The gear 150 and the shaft 149, as well as the cam 152, and the eccentric 148 are supported on the standard 150 on the table extension 63 (see Fig. 1).

Attached to the lower end of the guide rods 139 and 140 is the pin plate or pin holder 161, best shown in Fig. 7. The plate 161 has the spaced downwardly projecting, forward pins 168 and second pins 169. The pins 168 will stick into the cut, prepared bandages, as indicated at 170 in Fig. 5, while the pins 169 will move against the edges of the cut, prepared bandages, as indicated at 171 in Fig. 5, to advance the cut bandages across the table 119 to wrapping operation at F.

During this operation the actuating lever 146 and bell crank lever 143 will lift the pin plate 161 upon movement in the direction 172 and will lower the pin plate upon movement in direction 173 (see Fig. 5) through the rod 136, the sleeve 138 and 59ds 146.

The crank or eccentric 148, acting upon the actuator 146, will move the pin plate 161 backwardly and forwardly, as indicated by the arrows 174. This will cause the forward pins 168 to engage each bandage 175 after cutting, by insertion of the pins 168 into the bandage, as indicated at 170. Then the pins 168 will advance the cut bandage to position 170 (see Fig. 5).

Upon the next operation the pins 168 will move against the edge of the bandage 175 and will slide the cut bandages 175 to position 176, where they are engaged by the wrapping mechanism F.

The wrapping mechanism indicated at F receives the cut bandages indicated at 176 (see Fig. 5) and encloses them between the webs 190 and 191 (see also Figs. 5 and 6).

The webs 190 and 191 (see Fig. 1) are fed from the rolls 192 and 193. The rolls 192 and 193 are carried on the shafts 194 and 195 upon the frame members 196 and 197.

The webs 190 and 191 are fed toward the cutting mechanism E and are guided by the rollers 198 and 199.

When the bandage has been inserted between the rollers 198 and 199, as indicated in Fig. 5, it will pass to the right, as indicated at 200 in Fig. 6, between the two webs 190 and 191 up to the heated roller 201 which cooperates with the feed roller 202.

The roller 202 will be driven by the shaft 203 and the gear 204. The gear 204 is driven by the pinion 205 on the shaft 206. The shaft 206 is driven by the sprocket wheel 207 and the chain 208 from the shaft 149.

The heated roller 201, as best shown in Fig. 9, has a central shaft 209 and the end plates 210.

There are a series of peripheral end ridges 211 which press upon the ends of the wrapper 212 of Fig. 8, to give the transverse ridges 213 of Fig. 10.

There is also provided the parallel ridges 214 extending the length of the cylinder 201. These ridges 214 give the effect at 215 on the finished bandage shown on Fig. 10.

The two webs 190 and 191 will be thoroughly sealed together by these ridges 211 and 214 of the roller 201. The wrapper will enclose the elevated portion 216 of the prepared bandage folded by the folded pad H as well as the end extensions 219.

It will be noted that the heat sealing roller 201 is provided with a recess 217 to receive the enlarged portion 216 of the prepared bandage and it has the shallow portions 218 to receive the extended end portions 219 of the prepared bandage.

The heat sealing is limited to the ridges 211 and 214 and which act upon the edges 213 and 215 of the prepared bandage. A tear string or band may be wrapped in together with the sheets 190 and 191.

After passing the heat sealing roller 201, the sealed, prepared bandage is then carried to the rotary cutter 230 having the knives 231. The rotary cutter 230 is driven by the chain 232. The cutter 230 turns in the shaft 233 upon the upright structural member 197.

The rubber roll 234 mounted on the shaft 235 cooperates with the cutters 231 to cut the prepared, sealed bandage in separated strips, as indicated in Fig. 10.

The cut or scored bandage then passes, as indicated at 236, upon the reel 237 having the shaft 238. The shaft 238 is driven through the sprocket wheel 239 and the chain 240. The continuous strip of wrapped, sealed, prepared bandage will then be wrapped upon the roll 237.

If desired, instead of a rotary scorer and cutter 230, it is possible to use a reciprocatory scorer and cutter, which will be operated from a cam. Where it is desired to provide strips of 5, 10 or 12 prepared bandages instead of the continuous roll at K, the reciprocatory or rotary device 230 may be arranged to score the connecting wrapper between 5, 10 or 12 prepared bandages and then cut the wrapper between the groups of scored, prepared bandages.

In the rotary device 230, this may be provided by causing one of the blades 231 to be a cutting blade while the other blades are scoring blades. In a reciprocatory knife the edge may be serrated to score the wrapper connection between 5, 10 or 12 bandages and then the cam will permit an extra long stroke which will have the effect of severing the connection of the wrapper.

With respect to the cutter J, this cutter may also be rotary, as shown at 230—234 and between the blades 231 may be provided pins or rods fitting in slots in the plate 119 to move the cut, prepared bandage to the position 170, as, for example, indicated in Figs. 5 and 6.

The pins 169 may be replaced by bars or other pusher members to push the cut bandages 170 forwardly to between the rollers 198 and 199, from which position they will be carried forward by the wrapping strips 190 and 191. The plate 119 is desirably provided with slots or grooves to receive the pins 168 and 169.

Although not preferred, the reciprocatory pin device E may be replaced by rotary devices, the prongs or pushers of which may project upwardly through slots in the plate 119.

The upper plate 300 (see Figs. 5 and 6) is spaced between the pairs of pins 168 and 169 and it holds the cut bandages down and at the same time assures stripping thereof from the pins 168.

In respect to the heated roller of Fig. 9, the paper strips 190 and 191, which are coated upon their adjacent faces with a heat-sensitive resin or plastic, may be preheated so as to enable the roller of Fig. 9 to act upon shorter contact and enable increased speed to the mechanism, for example from 100 to 150 prepared bandages a minute up to 200 to 500 prepared bandages a minute. This may also be accomplished by applying several flat surface rollers similar to Fig. 9, but without the corrugations or indentations, to the sheets or strips 190 and 191 to warm them up and soften the coating in a preliminary fashion before the roller of Fig. 9 is applied.

It is then apparent that the present application has provided a novel, prepared bandage assembling, sealing and cutting machine which will provide sanitary bandages at a high rate of speed and conform with all governmental regulations.

As indicated in Fig. 1, the entire device is compact, readily accessible for repair and there is a smooth continuous flow from the initial rolls or reels of bandage, soft gauze, stiff gauze and wrapping material to the final packages as they are taken up upon the reel 237.

The vertical and horizontal oscillating device E is particularly advantageous in feeding the cut, individual bandages forwardly before wrapping while the wrapping mechanism F will assure both wrapping and sealing of the bandages.

The embodiment of the invention shown and described herein is to be considered merely as illustrative, as the invention is susceptible to variation, modification and change within the spirit and scope of the appended claims.

Having now particularly described and ascertained the nature of the invention, and in what manner the same is to be performed, what is claimed is:

1. In a prepared bandage making and wrapping machine, said machine receiving the bandages as cut adhesive tape, cut soft gauze and cut stiff gauze in assembled relationship, feeding means having an element to engage the cut assembled material to advance said cut materials, wrapping means to wrap said cut materials in heat sealing sheet materials and a heated roller to seal the edges of the sheet materials around said cut materials, said feeding means including a double actuator operated in synchronism with said machine and a plurality of bell crank levers operated by said double actuator, one actuator giving an oscillating vertical movement to the engagement element and the other actuator giving an oscillating horizontal movement to the engagement element, whereby the bandages are first advanced part way in the first feeding operation and are then advanced the rest of the way on the second feeding operation, said machine having a table onto which the cut assembled materials are deposited and said feeding means advancing said cut assembled materials across said table.

2. In a prepared bandage making and wrapping machine, said machine receiving the bandages as cut adhesive tape, cut soft gauze and cut stiff gauze in assembled relationship, feeding means having an element to engage the cut assembled material to advance said cut materials, wrapping means to wrap said cut materials in heat sealing sheet materials and a heated roller to seal the edges of the sheet materials around said cut materials, said engagement element of said feeding means including a vertically and horizontally reciprocating element to successively engage the cut materials and advance them to the wrapping means, said feeding means including a double actuator operated in synchronism with said machine and a plurality of bell crank levers operated by said double actuator, one actuator giving an oscillating vertical movement to the engagement element and the other actuator giving an oscillating horizontal movement to the engagement element, whereby the bandages are first advanced part way in the first feeding operation and are then advanced the rest of the way on the second feeding operation, said machine having a table onto which the cut assembled materials are deposited and said feeding means advancing said cut assembled materials across said table.

3. In a prepared bandage making and wrapping machine, said machine receiving the bandages as cut adhesive tape, cut soft gauze and cut stiff gauze in assembled relationship, feeding means having an element to engage the cut assembled material to advance said cut materials, wrapping means to wrap said cut materials in heat sealing sheet materials and a heated roller to seal the edges of the sheet materials around said cut materials, said engagement element of said feeding means including a plurality of pins to engage and advance the cut materials to the wrapping means, said feeding means including a double actuator operated in synchronism with said machine and a plurality of bell crank levers operated by said double actuator, one actuator giving an oscillating vertical movement to the engagement element and the other actuator giving an oscillating horizontal movement to the engagement element, whereby the bandages are first advanced part way in the first feeding operation and are then advanced the rest of the way on the second feeding operation, said machine having a table onto which the cut assembled materials are deposited and said feeding means advancing said cut assembled materials across said table.

4. In a prepared bandage making and wrapping machine, said machine receiving the bandages as cut adhesive tape, cut soft gauze and cut stiff gauze in assembled relationship, feeding means having an element to engage the cut assembled material to advance said cut materials, wrapping means to wrap said cut materials in heat sealing sheet materials and a heated roller to seal the edges of the sheet materials around said cut materials, said engagement element of said feeding means including a vertically and horizontally reciprocating pin plate, said feeding means including a double actuator operated in synchronism with said machine and a plurality of bell crank levers operated by said double actuator, one actuator giving an oscillating vertical movement to the engagement element and the other actuator giving an oscillating horizontal movement to the engagement element, whereby the bandages are first advanced part way in the first feeding operation and are then advanced the rest of the way on the second feeding operation, said machine having a table onto which the cut assembled materials are deposited and said feeding means advancing said cut assembled materials across said table.

5. In a prepared bandage making and wrapping machine, said machine receiving the bandages as cut adhesive tape, cut soft gauze and cut stiff gauze in assembled relationship, feeding means having an element to engage the cut assembled material to advance said cut materials, wrapping means to wrap said cut materials in heat sealing sheet materials and a heated roller to seal the edges of the sheet materials around said cut materials, said engagement element of said feeding means including a hinged suspended carrier composed of an upwardly and downwardly swinging cross guide bar member, a plurality of vertical suspensions provided with a sliding bearing on said guide bar member and a vertically and horizontally reciprocating pin plate to engage and move said cut materials carried by said vertical suspensions, said feeding means including a double actuator operated in synchronism with said machine and a plurality of bell crank levers operated by said double actuator, one actuator giving an oscillating vertical movement to the engagement element and the other actuator giving an oscillating horizontal movement to the engagement element, whereby the bandages are first advanced part way in the first feeding operation and are then advanced the rest of the way on the second feeding operation, said machine having a table onto which the cut assembled materials are deposited and said feeding means advancing said cut assembled materials across said table.

6. In a prepared bandage making and wrapping machine, said machine receiving the bandages as cut adhesive tape, cut soft gauze and cut stiff gauze in assembled relationship, feeding means including an engagement element having an element to engage the cut assembled material to advance said cut materials, wrapping means to wrap said cut materials in heat sealing sheet materials and a heated roller to seal the edges of the sheet materials around said cut materials, and actuating means to cause intermittent operation of said assembling and feeding means, said feeding means including a double actuator operated in synchronism with said machine and a plurality of bell crank levers operated by said double actuator, one actuator giving an oscillating vertical movement to the engagement element and the other actuator giving an oscillating horizontal movement to the engagement element, whereby the bandages are first advanced part way in the first feeding operation and are then advanced the rest of the way on the second feeding operation, said machine having a table onto which the cut assembled materials are deposited and said feeding means advancing said cut assembled materials across said table.

7. A wrapping and packaging machine for prepared cut bandages composed of adhesive tape carrying a pad of gauze and protected by strips of protective stiff gauze comprising a mechanism for feeding said cut bandages one by one to a wrapping arrangement including a table upon which the cut bandages are deposited after cutting, a vertically and horizontally reciprocating bandage engaging member to engage and advance said bandages on the table.

8. The machine of claim 7 in which said pin-engaging member has a plate having downwardly directed pins, two vertical guide rods extending upwardly from said plate, a sleeve attached to the top of said guide rods and a cross horizontal rod extending through said sleeve, levers at the ends of said rod to permit said rod to be reciprocated and cam and lever arrangements to cause said vertical and horizontal reciprocating movement.

9. A reciprocating feed for prepared cut bandages comprising a table, a vertically and laterally reciprocating pin device to engage and advance the bandages on said table and means to receive said bandages from said table and wrap them.

10. The feed of claim 9, said reciprocating pin device having a horizontal plate carrying a plurality of pins and means to elevate and lower said plate and then to advance said plate in lowered position in engagement with the cut bandages.

11. A reciprocating pin plate feed for feeding in step-by-step fashion assembled and cut bandages formed of a bottom layer of adhesive tape, an intermediate four-ply folded soft pad gauze strip and overlapping protective stiff gauze strips from a cutting position to a wrapping position comprising a feed table extending from cutting position to wrapping position, a horizontally and vertically oscillating pin plate above the feed table to feed the assembled and cut bandages from cutting position to wrapping position and means to operate said pin plate to pick up each bandage as it is cut at said cutting position and advance it part way to said wrapping position and then subsequently on a second operation to advance it the rest of the way to said wrapping position.

12. The feed of claim 11, said pin plate having upwardly extending arms, a tubular carrier at the upper end of said arms, an oscillating member to elevate and lower said tubular carrier and another oscillating member to move said tubular carrier backwardly and forwardly, and cam and crank means to drive said tubular carrier.

13. The pin feed of claim 11, said table being provided with a superimposed slotted plate and said pins when engaging said cut bandages being guided by said plate.

14. The pin feed of claim 11, said means including cam and crank means and bell crank lever drive for said pin plate.

References Cited in the file of this patent

UNITED STATES PATENTS

| Number | Name | Date |
| --- | --- | --- |
| 1,595,583 | Stokes | Aug. 10, 1926 |
| 1,726,418 | Aldrich | Aug. 27, 1929 |
| 1,931,284 | Carlson | Oct. 17, 1933 |
| 2,027,232 | Hutt et al. | Jan. 7, 1936 |
| 2,029,260 | Eustis et al. | Jan. 28, 1936 |
| 2,033,736 | Perryman | Mar. 10, 1936 |
| 2,103,390 | Salfisberg | Dec. 28, 1937 |
| 2,107,036 | Heineman | Feb. 1, 1938 |
| 2,232,783 | Haushur | Feb. 25, 1941 |
| 2,443,327 | Salfisberg | June 15, 1948 |
| 2,563,071 | Salfisberg | Aug. 7, 1951 |